Sept. 24, 1935.  A. W. CLARK  2,015,616
SAFETY FASTENER FOR NECKLACES AND OTHER CHAINS
Filed Aug. 9, 1934
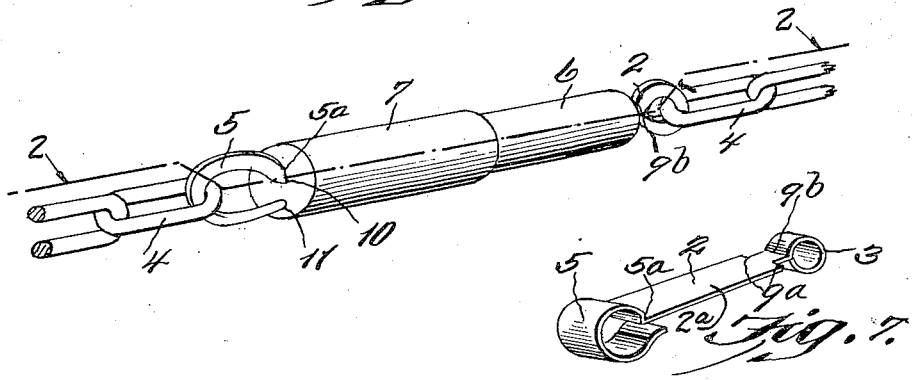
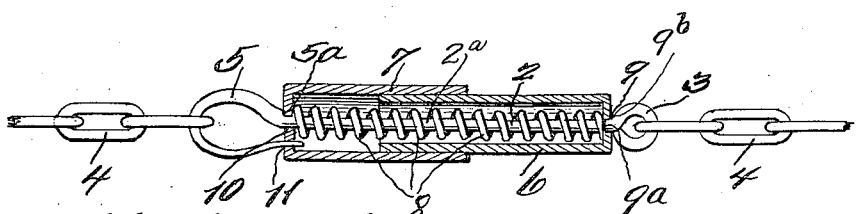
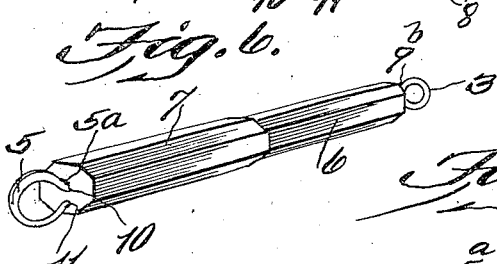
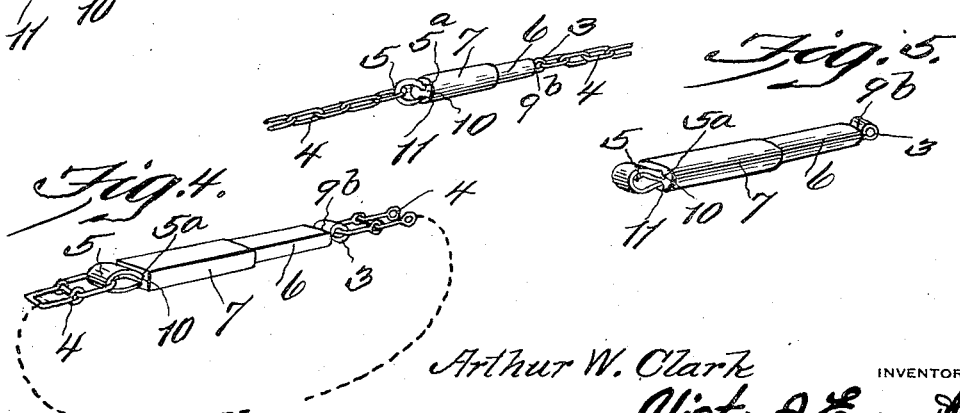
Arthur W. Clark, INVENTOR
BY Victor J. Evans & Co.
ATTORNEYS Patented Sept. 24, 1935

2,015,616

UNITED STATES PATENT OFFICE 2,015,616

SAFETY FASTENER FOR NECKLACES AND OTHER CHAINS

Arthur W. Clark, Upper Darby, Pa.

Application August 9, 1934, Serial No. 739,164

3 Claims. (Cl. 24—239)

This invention relates to an improved safety fastener for necklaces and various and many other chains, viz: wrist watch chains, ribbons, ordinary bracelet chains, tow lines, traces of harnesses, and such chains as may be used on board ship, or on any chain where a safety hook fastener may be appropriately applied, and the purpose of the fastener is to provide a device, in which a solid connector or link joins to the two ends of the chain, or may join the chain, to a fixed location, there being a closed eye at one end of the solid connector or link, to which one end of the chain is connected, the other end of the solid link having a hook or an open eye for detachable connection to the other end of the chain or to a fixed location, there being a pair of sleeves telescopically united housing the entire portion of the solid link between the eye and the hook, as well as housing a coil tension spring through which the solid link extends.

Another purpose of the invention is that through the medium of the one solid piece or link the possibility of a separation of any of the connecting parts is entirely eliminated, and it is obvious that the safety fastener may be made of various metals, such as white gold, silver, yellow or pink gold, or any other precious metal and in the event that the fastener is used outside of the jewelry art, namely in connection with tow lines, traces, or in connections with chains on ship board, or on heavy chains where considerable strength and durability are essential, the fastener may be made of steel, iron, brass or any other suitable metal.

It is also obvious that the fastener may be made in various shapes, cylindrical, flat, triangular in cross section or any other suitable shape that the trade may require.

In the adaptation of the fastener to a wrist watch or a conventional bracelet the fastener may be made flat or oval shape in cross sectional area, and in constructing the fastener flat or oval or triangular in cross section, the cooperative parts of the fastener are prevented from turning relative to each other, and through the medium of this construction the end of the hook is guided into a circular opening in one of the sleeves of the fastener, the end of the hook being guarded against being caught in anything whatever, as well as insuring safety and strength to the hook.

Another purpose of this invention is to provide a construction of an article of manufacture of this kind, which is simple, practical and inexpensive, and can be expeditiously assembled, whereas in similar patented articles of this kind, the assembling of the structure is more or less tedious.

Since it has been intimated above that devices of a similar nature have been patented it is not the purpose to claim generically the constructions and arrangement of the various features, but to present the combination of features and arrangement of the parts within the confines of the claims appended hereto.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is an enlarged view in perspective of the improved fastener constructed in accordance with the invention.

Figure 2 is a longitudinal sectional view on line 2—2 of Figure 1.

Figure 3 is a relatively small view indicating the adaptability of the structure herein shown to a necklace chain.

Figure 4 is a view of the fastener shown flat.

Figure 5 is a view of the fastener as shown oval shape.

Figure 6 is a view showing the fastener octagon shape in cross sectional area, it being obvious that any polygonal cross sectional area shape may be employed.

Figure 7 is a detail view of the flat one piece solid link or shaft.

Referring to the drawing 2 identifies a solid link, which has a closed eye 3 at one end and to which one end of a chain 4 is connected. The other end of the solid link has a hook 5, to which the opposite end of said chain may be connected detachably.

A pair of telescopically united sleeves 6 and 7 (the former entering the latter) house the entire portion 2a of the solid link, that is the portion between the closed eye and the open eye or hook. A tensioned coil spring 8 surrounds the intermediate portion 2a of the solid link and is also housed by the two sleeves, the remote ends of which acting as abutments for the opposite ends of the spring, said sleeves acting to prevent displacement of the spring.

The remote closed ends of the sleeves are provided with rectangular openings 9 and 10, which constitute one of the main features of the device. Another essential feature of the article of manufacture is that the intermediate portion 2a of the solid link is likewise rectangular in cross section to slidably fit the rectangular openings, and thereby particularly avoid turning of the solid link or the rotation of the sleeves. The closed end of the sleeve 7 has an additional opening 11, which receives the terminal or extremity of the hook, the coil spring acting to retain the sleeves in their maximum spread positions away from each other, as well as keeping the additional opening 11 in engagement with the terminal or extremity of the hook.

The hook 5 has a shoulder 5a, against which one end of the sleeve 7 engages to limit the sleeve in its maximum position adjacent the hook due to the action of the spring, which spring in turn retains the closed end of the sleeve 6 abutting against a portion of the eye 3.

The shoulder 5a at the hook end of the link acts as a seat or rest for one of the sleeves, while the shoulder adjacent the eye or ring end of the link prevents the other sleeve from sliding on the link and facilitates easy operation of both sleeves. As previously stated the sleeves in the solid one piece link or shaft can be made in various polygonal shapes in cross sectional area.

Another essential feature of this invention is in the assembling of the fastener. For example the solid link is first formed with a hook, which at all times is open, the eye being the very last step in the method of constructing the device. The solid link is then passed through the rectangular opening 10 of the sleeve 7, which prevents any rotation of either element. The coil spring is then fitted in surrounding relation to the solid link within the sleeve 7, and then the sleeve 6 is engaged with the solid link and allowed to enter the open end of the sleeve 7, the spring so interposed between the two sleeves reasonably under tension, and as stated before the last step to be performed in constructing this fastener is to form the eye on the end of the solid link opposite the hook, the eye then being formed and in close position against the closed end of the sleeve 6, thereby retaining said parts in their relative operative positions. The additional opening 11 in the end of the sleeve 7 receives the free extremity of the hook when the sleeve 7 is retained in its normal remote position away from the sleeve 6, thereby preventing a chain or the like being connected to the hook, unless the sleeve 7 is moved toward the sleeve 6 leaving the end of the hook free, in which event a link of a chain may be engaged with the hook.

The shoulders 9a and 9b adjacent the eye or ring 3 of the solid link prevents movement of the sleeve 6 in either direction. In other words the two opposite shoulders 9a of the solid link more clearly shown in Figure 7 prevent movement of the sleeve 6 toward the sleeve 7, while the shoulder 9b (which is really the base of the eye or ring 3) prevents movement of the sleeve 6 away from the sleeve 7.

The invention having been set forth, what is claimed is:

1. A safety fastener comprising a link rectangular in cross section, a pair of telescopically united sleeves housing said link and having remote closed ends provided with rectangular openings for the passage of the link therethrough, a coil spring surrounding the link and having its end convolutions engaging the closed ends of the sleeves for urging the latter apart, a hook formed on one end of the link, an eye formed on the opposite end thereof and together with the hook being disposed exteriorly of the housing and the closed end of one sleeve having an additional opening therein to normally receive the extremity of the hook.

2. A safety fastener comprising a link rectangular in cross section throughout its length, a pair of telescopically united sleeves housing said link and provided with closed outer ends having rectangular openings therein for the passage of the link, a coil spring surrounding the link and engageable with the closed end of the sleeves to urge the latter apart, a hook at one end of the link, an eye at the opposite end thereof and together with the hook being disposed exteriorly of the housing, the closed end of one of the sleeves having an additional rectangular opening therein to normally receive the extremity of the hook, and a shoulder provided on the link and arranged in the path of the closed end that receives the extremity of the hook to limit the passage of the extremity within its opening.

3. A safety fastener comprising a link rectangular in cross section throughout its length, a hook at one end of the link, an eye at the opposite end thereof, a pair of telescopically united sleeves surrounding the link and having closed ends provided with openings for the passage of the link therethrough, a coil spring surrounding the link and engageable with the closed ends for urging the sleeves apart, the closed end of one of the sleeves having an additional opening therein to normally receive the extremity of the hook, a shoulder on the link at the juncture of the hook therewith to limit the passage of the extremity in its opening, and shoulders adjacent the eye and cooperating with the latter to limit the movement of the adjacent sleeve in either direction.

ARTHUR W. CLARK.